United States Patent [19]

Grigsby et al.

[11] Patent Number: 5,802,368
[45] Date of Patent: Sep. 1, 1998

[54] DYNAMIC LIBRARY TASK SWITCHING

[75] Inventors: Kenneth B. Grigsby, San Jose; Aleksander L. Smundak, Cupertino, both of Calif.

[73] Assignee: Informix Software, Inc., Menlo Park, Calif.

[21] Appl. No.: 537,235

[22] Filed: Sep. 29, 1995

[51] Int. Cl.[6] .................................................... G06F 12/02
[52] U.S. Cl. ............................................. 395/685; 395/674
[58] Field of Search .................................... 395/685, 670, 395/674, 677, 653, 619, 570; 364/281.3

[56] References Cited

U.S. PATENT DOCUMENTS

| | | | |
|---|---|---|---|
| 5,247,681 | 9/1993 | Janis et al. | 395/685 |
| 5,255,379 | 10/1993 | Melo . | |
| 5,365,606 | 11/1994 | Brocker et al. . | |
| 5,410,698 | 4/1995 | Daneels et al. | 395/685 |
| 5,517,651 | 5/1996 | Huck et al. | 395/570 |
| 5,530,858 | 6/1996 | Stanley et al. | 395/677 |
| 5,541,853 | 7/1996 | Croft | 395/653 |
| 5,581,768 | 12/1996 | Garney et al. | 395/674 |
| 5,596,755 | 1/1997 | Pletcher et al. | 395/653 |
| 5,608,898 | 3/1997 | Turpin et al. | 395/619 |

FOREIGN PATENT DOCUMENTS 0 315 493 A2  5/1989  European Pat. Off. .

OTHER PUBLICATIONS

Crawford, J., "Architecture of the Intel 80386," Proceedings IEEE Int. Conf. On Computer Design: VLSI in Computers, ICCD '86, The Computer Society of the IEEE, Port Chester, NY, 6 Oct. 1986, pp. 155–160.

Bruck, M., "An 80386 Implementation of UNIX System V," IRE Wescon Conference Record, Los Angeles, CA, 1987, vol. 31, Apr. 4 pp. 1–9.

Pietrek, Matt; "Understanding Windows 95 memory management," *Microsoft Systems Journal* V10, n. 4 p. 19(13), Apr. 95.

Schulman Andrew; "Windows 3.0", *PC Magazine* V10 n11 p. 347(10) Jun. 11, '91.

Schulman Andrew; "Porting DOS programs to protected mode Windows" Microsoft Systems Journal, v6, n5 p. 79(18) Sep., 91.

Petzold, Charles; "OS–2 & 80286 protected mode", *PC magazine* V6, p. 441(4) Oct. 13, 1987.

Schulman, Andrew; "The programming challenge of Windows protected mode", PC Magazine, V10, n12, p. 371(10) 25 Jun. '91.

*Primary Examiner*—Alvin E. Oberley
*Assistant Examiner*—Patricia Caldwell
*Attorney, Agent, or Firm*—Fish & Richardson P.C.

[57] ABSTRACT

A method and apparatus for providing per-instance data memory in a dynamic link library (DLL) linked to multiple tasks or to multiple instances of one task in the context of an operating system that does not provide such a feature. The invention includes providing a task switch enhancer DLL that allocates and manages a memory segment to store per-instance data of a DLL for a task as a substitute for an original per-instance data segment for that task.

7 Claims, 6 Drawing Sheets

FIG._1
(PRIOR ART)
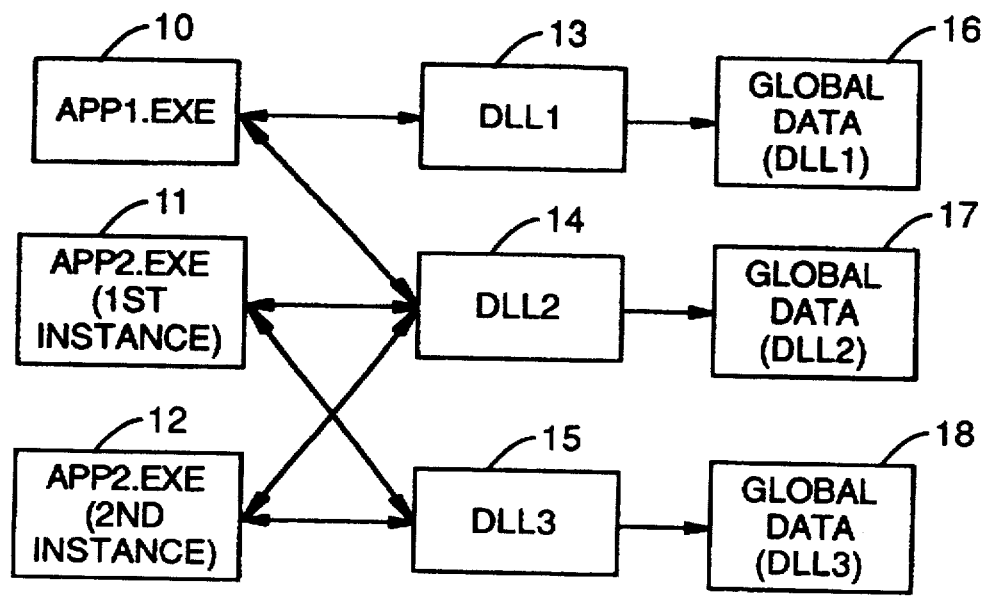

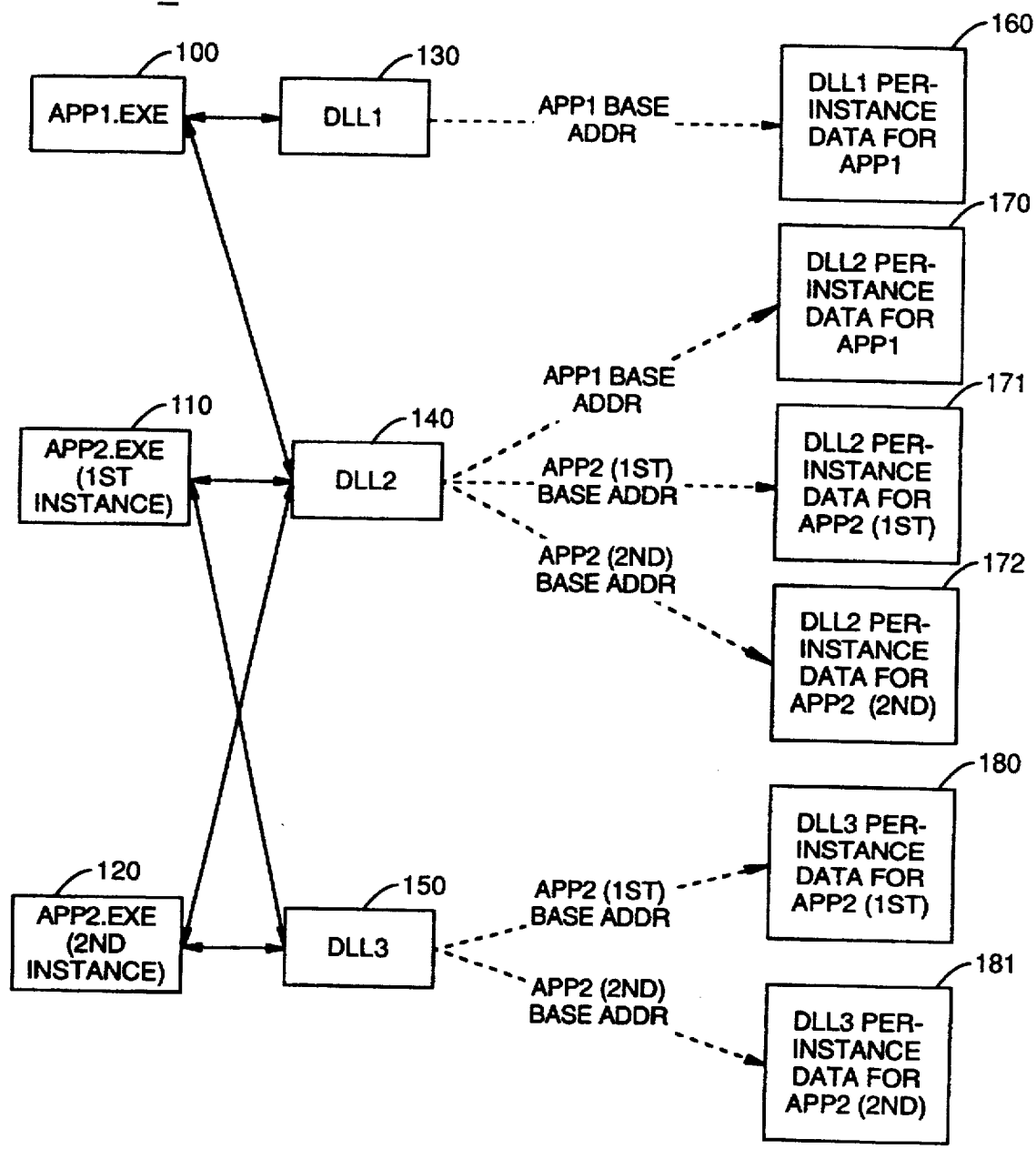
FIG._2

FIG._2A
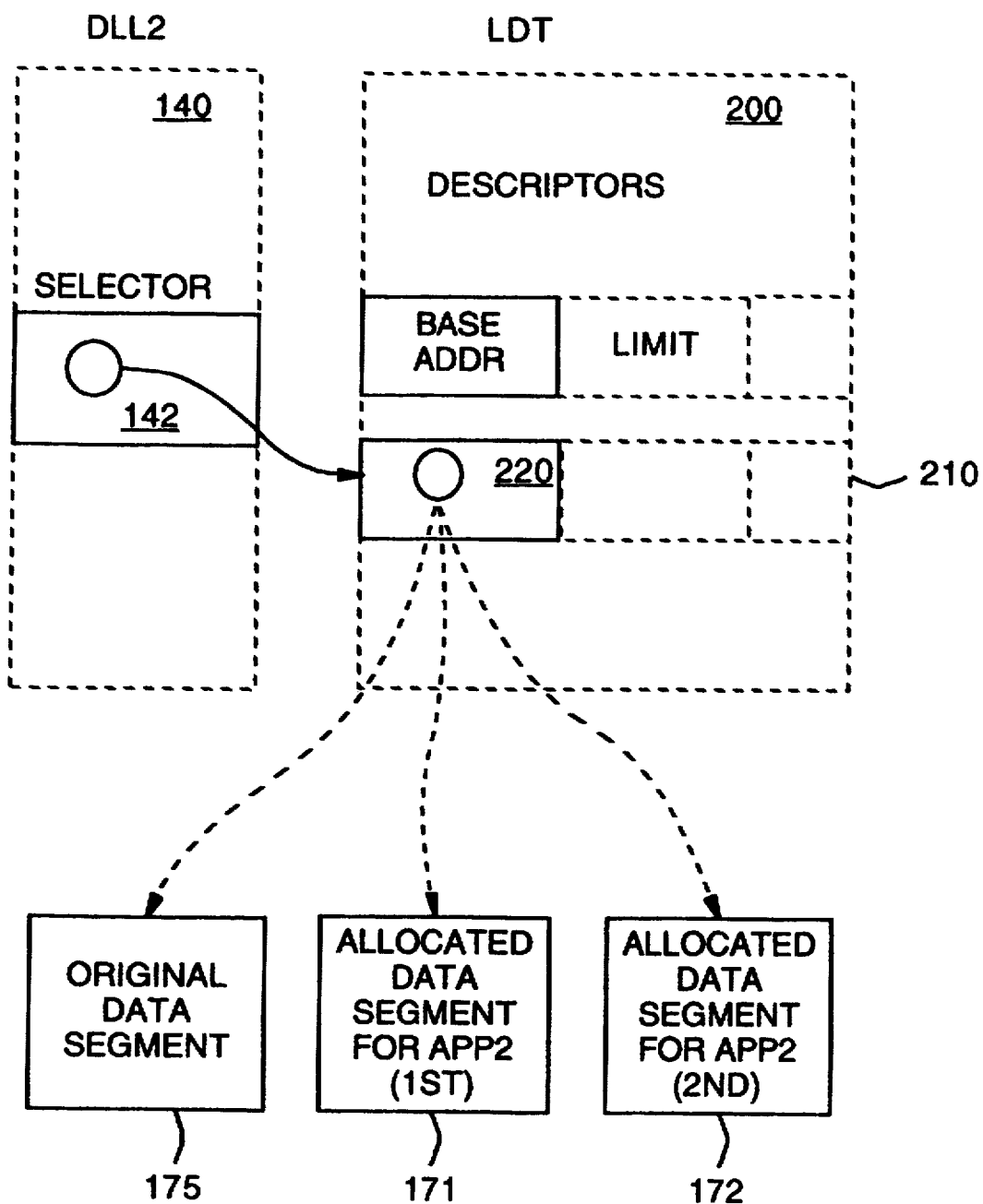

FIG._3
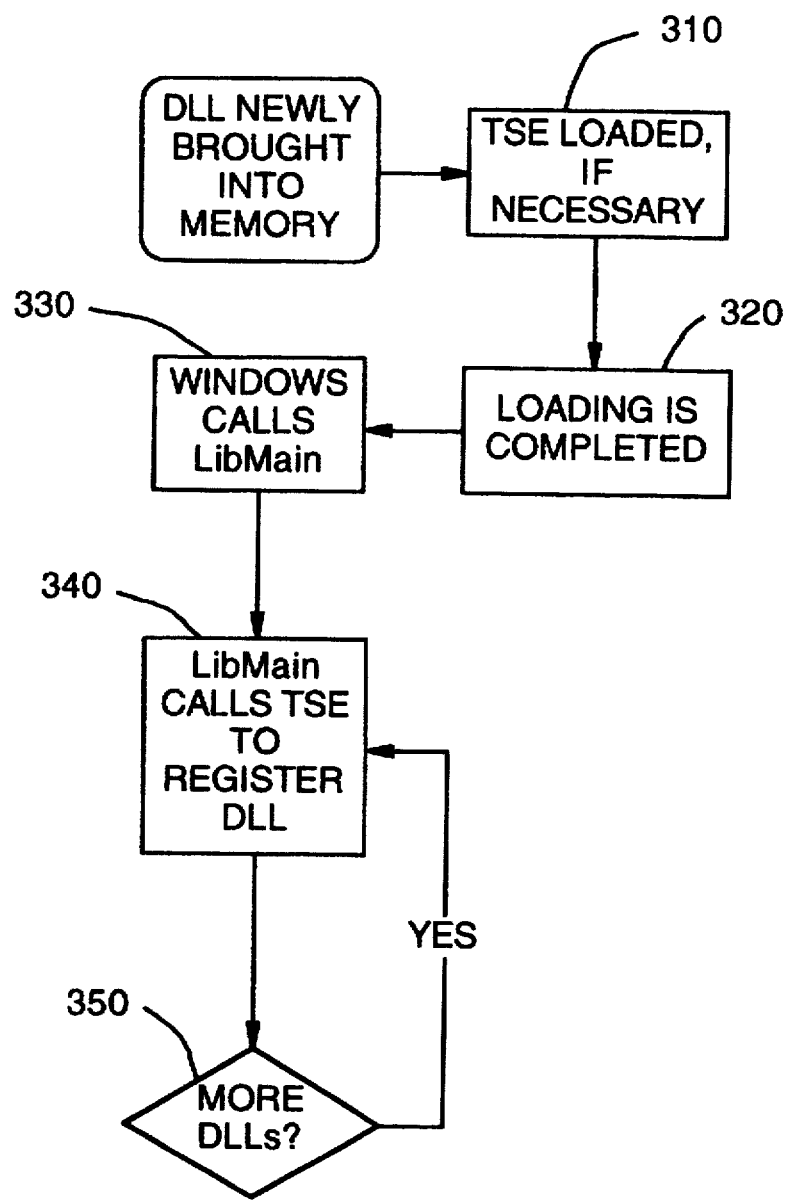

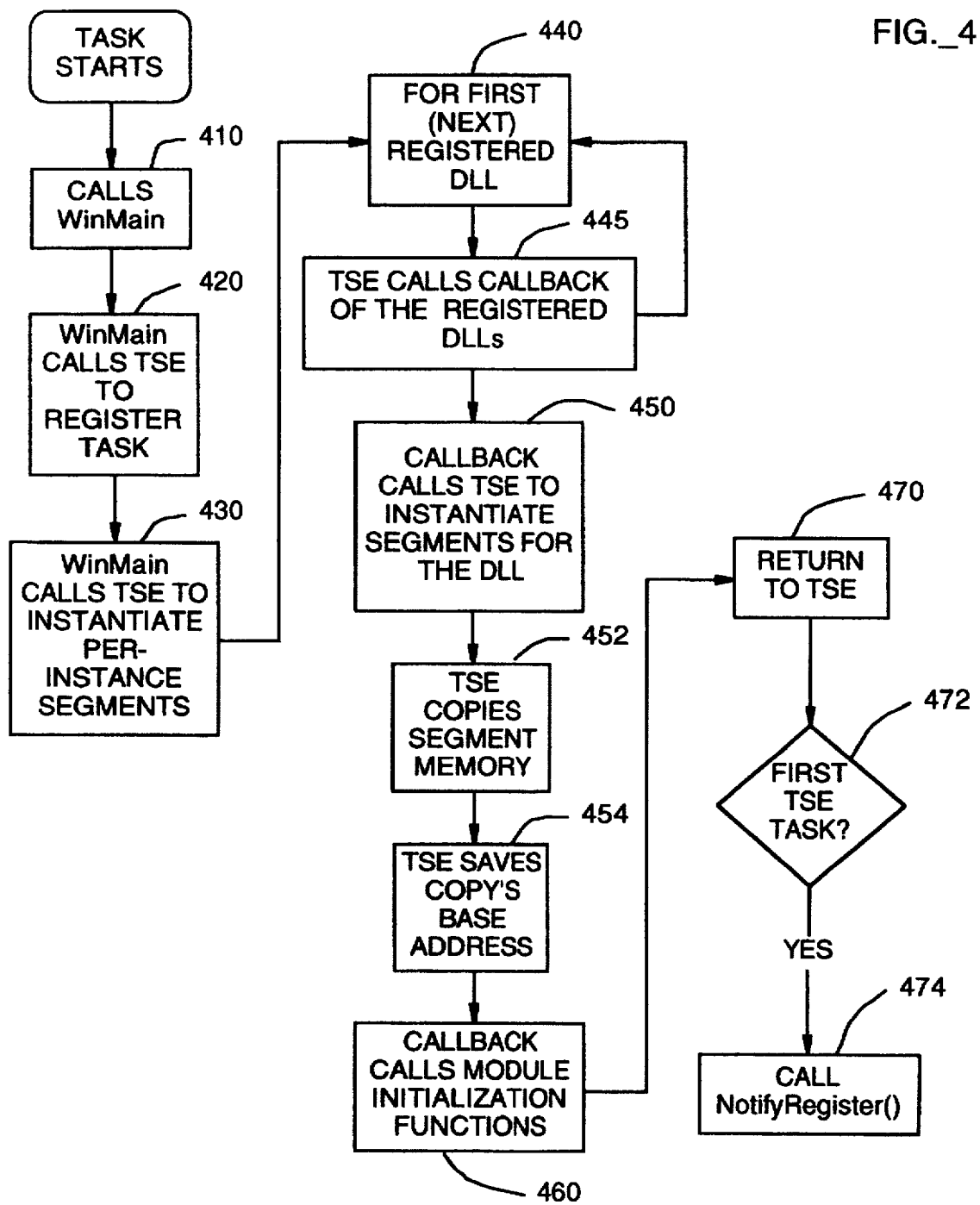
FIG._4

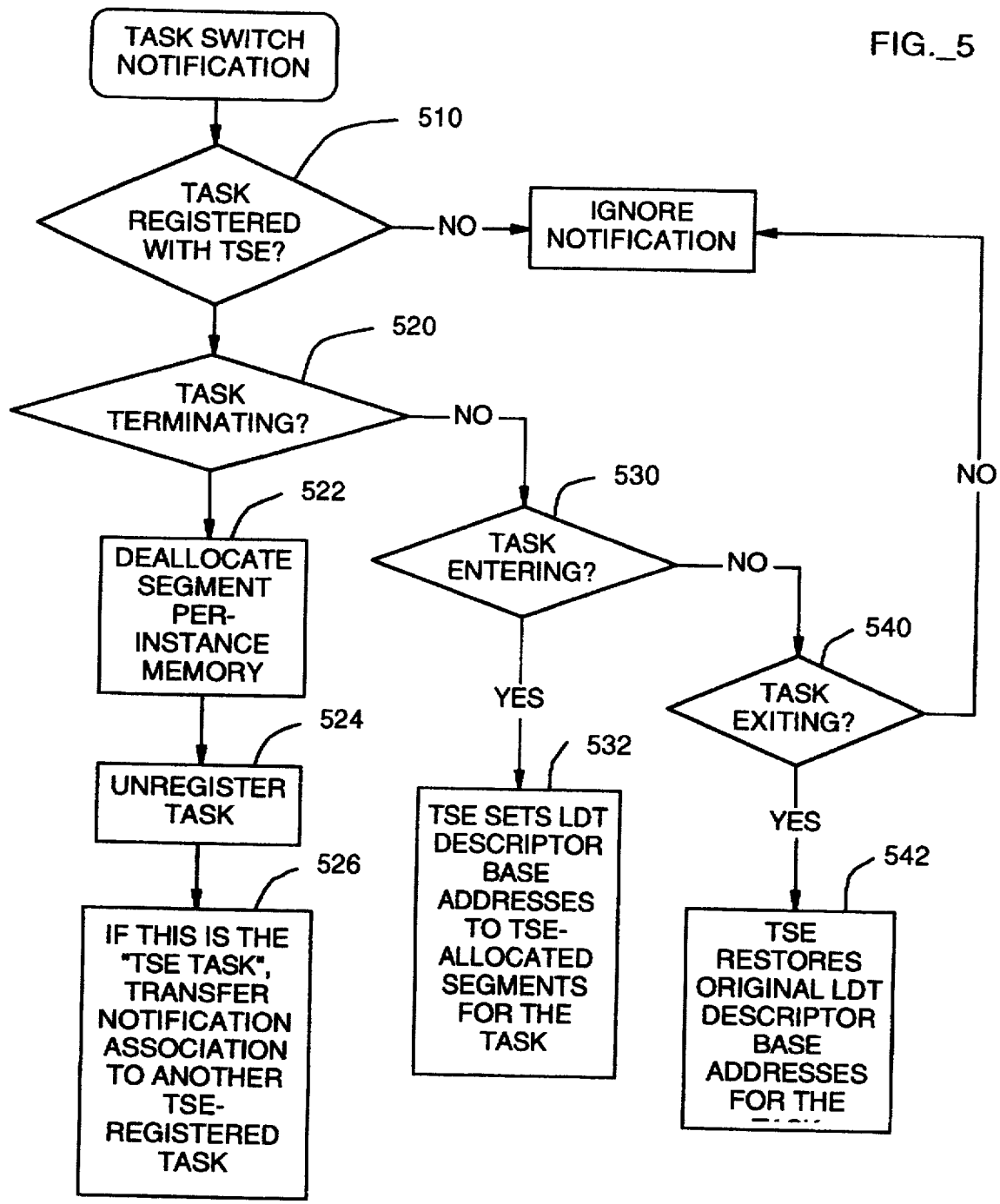
FIG._5

DYNAMIC LIBRARY TASK SWITCHING

BACKGROUND OF THE INVENTION

1. Field of the Invention

The invention relates to methods and programs for running multiple instances of programs and shared libraries under a multi-tasking operating system, and in particular to running such programs and libraries under an operating system such as Microsoft Windows 3.1.

2. Background

A dynamic link library (DLL) provides a shared library of code and data that can be linked to multiple tasks (such as application programs) in an operating system such as Microsoft® Windows 3.1 or Windows 3.11. In this context, it is desirable to be able to run multiple instances of a DLL, and multiple instances of an application, simultaneously. Running multiple instances of an application in Windows 3.1 would require that the application's DLLs be shared between instances of the application or across applications using the same DLL. While this feature is available in a number of operating system environments, such as Microsoft® Windows 95, it conflicts with the design of the Windows 3.1 and 3.11 DLL. (From this point on, the term DLL will refer to a DLL as it is known in the Windows 3.1 and 3.11 environments, which run on microprocessors compatible with the Intel® brand 80x86 family of microprocessors, and the term Windows will refer to Windows 3.1 and 3.11 environments, unless expressly noted otherwise.) In a Windows 3.1 DLL with multiple data segments, global variables will be shared by all the applications using the DLL.

In an operating system that is designed to run applications in separate address spaces, memory would be allocated for each application and the memory of the application would be switched in or out by the operating system by changing a set of registers or memory locations to switch to the appropriate memory for the application. The Windows 3.1 environment was not designed this way even though Intel microprocessors make the functionality available in a mode of operation called protected mode. The Intel protected mode has the same segment registers (CS, DS, ES, and SS) as the real mode, but the segment address is a 16-bit item known as a "selector". Protected mode requires a block of memory known as a "descriptor table". The descriptor table can contain up to 8,192 8-byte entries. The upper 13 bits of the selector is an offset that references one of these entries. The descriptor table entry contains a "base address" that determines the starting point for the memory being accessed by the selector and a "limit address" that supplies the end of the range of memory accessible by the selector.

In other multitasking operating systems, the GDT (global descriptor table) provided by the Intel protected mode is used to manage operating system memory and each process gets its own LDT (local descriptor table) for its own memory. In this way, processes are protected from interfering with each other. However, Windows 3.1 uses a single LDT that is shared by the operating environment and all Windows applications.

Turning to FIG. 1, and as stated above, global variables in segments 16, 17, and 18 will be shared by all the applications 10, 11, and 12 using each Windows 3.1 DLL 13, 14, and 15. (In the figure, the applications are APP1, APP2, and a second instance of APP2, respectively, and the DLLs are DLL1, DLL2, and DLL3, respectively.) This is a side effect of the fact that the code in a DLL is the same regardless of which application is accessing it. A DLL is initialized once when it is first loaded into memory by the loader. If a DLL has more than one data segment, a selector for each data segment is allocated by the loader and inserted into the code segment at any point in the code that accesses the data segment. Since this selector address is inserted into the code segment which is shared between applications, the data must also be shared. This results in global data being shared between applications.

Various approaches for dealing with the problem have been implemented. All require some method for gathering per-application instance data into a block of memory allocated by the application and maintaining the "base address pointer" of this memory block for use when the application enters execution.

In a first approach, the task (application) passes the base pointer as a parameter on every call to the DLL. A shortcoming of this approach is that it is not applicable in a situation where the DLL is the implementation of a C++ class library and some of the classes have shared variables.

In a second approach, the base pointer is kept in a well-known place in the task, for example, in a fixed address at the beginning of the stack segment. The appropriate base pointer is made available automatically when each task is entered because each task has a unique stack address. A drawback of this approach is that it requires a special structure and a fixed position for each DLL using it.

SUMMARY OF THE INVENTION

The invention provides per-instance data memory in a DLL linked to multiple tasks or to multiple instances of one task. A base address for each DLL instance is kept for the individual DLLs and base addresses are switched when tasks are switched. The operating system is requested to inform an external service or 'switcher' DLL, called TSE (Task Switch Enhancer) when tasks are switched so that base addresses can be switched and other housekeeping can be done.

The gathering of per-instance data into a memory block for each application is done by a mechanism involving both the compiler and the linker. In the context of an illustrative fourth generation language (which we name "FGL") that generates C code for further compilation by a C compiler, the C language coding that will be described is done by the FGL compiler; otherwise, it is done by the programmer writing the C code, and the invention may be practiced either way. (The term C will be used generically to encompass C++ as well, as implemented, for example in the Microsoft® Visual C++ compiler, version 1.5.) By including instructions to the linker in a C program to indicate the segment in which a variable belongs, the linker will allocate all the variables belonging to the segment into one block. Including further instructions to the linker in linkage code supplied in a mandatory assembler object creates a unique segment group to prevent the linker from mixing such segments with others. Therefore, when the DLL is loaded, this segment will have its own descriptor, which is mapped at runtime to an instance-specific physical address.

The invention has a number of advantages. For example, using the invention, only variable declarations need to be modified to achieve per-instance operation, and efficient code results.

Other advantages and features will become apparent from the following description and from the claims.

BRIEF DESCRIPTION OF THE DRAWINGS

The accompanying drawings, which are incorporated in, and constitute a part of, the specification, schematically illustrate specific embodiments of the invention and, together with the general description given above and the detailed description of the embodiments given below, serve to explain the principles of the invention.

FIG. 1 is a block diagram illustrating tasks (applications), DLLs, and DLL data segments in prior art relationship.

FIG. 2 is a block diagram illustrating a relationship created by a task switch enhancer (TSE).

FIG. 2A is a schematic block diagram illustrating the relationship of a DLL selector to a local descriptor table (LDT) descriptor base address, to data segments created by the TSE.

FIG. 3 is a flowchart illustrating the process associated with bringing a DLL into memory.

FIG. 4 is a flowchart illustrating the process associated with first starting a task.

FIG. 5 is a flowchart illustrating the process associated with switching a task.

DETAILED DESCRIPTION

Turning to FIG. 2, applications 100, 110, and 120 are linked, as shown, to three DLLs 130, 140 and 150. Applications 110 and 120 are two instances of the same program. This corresponds to FIG. 1, except for the enhancements made to the applications and DLLs for TSE, which will be described. With the enhancements, however, a DLL, such as DLL2 140, will have a separate data segment 170, 171, and 172 for each task instance that is using the DLL, namely, in this illustration, applications 100, 110, and 120.

Turning to FIG. 2A, TSE effects the switching between or among data segments, illustratively segments 171 and 172, by switching the contents of the base address portion 220 of the descriptor 210 (in LDT 200) that selector(s) 142 (in DLL DLL2 140) point to. The base address 220 will point to the original data segment 175 loaded with DLL2 140 when no application is using DLL2 140, and to data segment 172 when application 120 is using DLL2 140.

Thus, turning back to FIG. 2, TSE will cause base address contents to point to data segments as shown in FIG. 2: DLL1 130 will point to data segment 160 when APP1 100 is linked to DLL1; DLL2 140 will point to data segment 170 when APP1 100 is linked to DLL2; DLL2 140 will point to data segment 171 when APP2 (first instance) 110 is linked to DLL2; DLL2 140 will point to data segment 172 when APP2 (second instance) 120 is linked to DLL2; DLL3 150 will point to data segment 180 when APP2 (first instance) 110 is linked to DLL3; and DLL3 150 will point to data segment 181 when APP2 (second instance) 120 is linked to DLL3.

Registration

Turning to FIG. 3, when a DLL is brought into memory, it registers itself with TSE, step 340, supplying a notification callback function. When a DLL is loaded that calls TSE routines, TSE is also loaded, if it has not already been loaded, step 310. After all required modules have been loaded (step 320), Windows calls LibMain( ) for a DLL (step 330), which calls TSE to register all of the DLLs linked to the task (steps 340 and 350).

Turning to FIG. 4, when a task starts execution, it calls WinMain( ) which calls TSE to register the task with TSE, steps 410 and 420. WinMain( ) also calls TSE to look through the task's DLL list and to call notification callbacks of the DLLs registered with it, steps 430, 440, and 445. The callback function will typically request TSE to instantiate some segment(s), steps 450, 452, and 454, and then call module initialization functions to initialize global and class member variables, step 460. Because instantiation (described below) copies the original segment, all the static initializations generated for global variables will be preserved.

Segment Instantiation

To instantiate a segment (which can belong either to an application or to DLL), TSE makes a copy of a segment memory and remembers its flat address. After that, every time the task is activated, TSE will set the address in the corresponding entry of the local descriptor table (LDT) to point to the remembered address. Thus, each instance of the task will use the instance data.

Initialization

To provide per-instance data to multiple tasks sharing a DLL, the data from the separate modules comprising a DLL is consolidated to allow easy duplication for each instance of an application using the DLL. This is done by including C compiler pragmas in the source code to name the segments and segment groups. Also, an assembler language object is created to be linked with the DLL to consolidate segment groups so the linker will group data segments together according to the names provided in the compiler pragmas. The assembler object also provides a function that returns the base address of this data segment.

A set of initialization functions is provided that includes a LibMain( ). (A LibMain( ) must be provided to initialize all Windows DLLs). This TSE LibMain( ) calls TseDllRegister( ) to register the DLL with TSE, step 340. Its arguments are (1) the Windows "instance handle" for identifying the DLL, and (2) the address of a callback function that will be called by TSE each time the DLL needs initialization for a new instantiation. The call to TseDllRegister( ) causes TSE to insert the DLL into a list of registered DLLs.

A set of initialization functions is provided to be called from the start-up module, for example, the WinMain( ) function, of an application for registering with TSE. These include TseTaskRegister( ), which causes TSE to place the Windows task handle in a list of tasks registered with TSE, step 420, and TseDLLInstantiateALL( ), which causes TSE to search through the module table for the calling task and compare the list of DLLs used by the task to the list of registered DLLs. When TSE finds a match, it calls the callback function previously recorded for the DLL when TseDllRegister( ) was called, step 445. In response, the DLL that TSE is calling passes back the selector that references the per-instance data segment of the DLL. TSE allocates a block of memory (which belongs to the task that will use the memory, not the TSE DLL) of the same size as the original data segment referenced by the selector and copies the contents of the original data segment into the newly allocated block of memory, step 452. TSE maintains the original selector and the selector of the newly allocated block in a list of selector pairs for each DLL being used by the task, step 454. (In place of TseDLLInstantiateALL( ), TseDLLInstantiate( ) can be called as often as needed to instantiate particular DLLs.)

In addition, TSE also calls the callback function and directs it to call any module initialization functions, step 460. Module initialization functions are typically generated by compilers to perform functions such as registering classes and initializing global variables.

In order to be notified of task switching events, TSE calls the Windows Toolhelp API NotifyRegister( ) function, passing to it the task handle of the TSE task and the address of a TSE function (the "notify callback") that will be called by Windows any time any task is entered or exited, steps 472 and 474. TSE must pass NofifyRegister( ) a task handle as a parameter, and it uses the task handle of the first task that called TSE. NotifyRegister( ) associates the notify callback with this task handle. When this task terminates, TSE recognizes the condition and, as described later, associates itself to another TSE-registered task. This particular task is referred to as the TSE task.

Operation

Turning to FIG. 5, when a task is entered, the notify callback in TSE checks the list of tasks registered with TSE to see if the task being entered is registered, steps 510 and 530. If it is and is entering step 530, TSE switches the descriptors of the selector pairs so that the original selector references the memory block allocated for the task by TSE, step 532, and the allocated selector references the original memory segment. When a task terminates or exits, the callback in TSE checks the list of tasks registered with TSE to see if the task is registered, step 510. If it is, TSE switches the descriptors of the selector pairs so that the original selector references the original data segment and the selector allocated by TSE references the allocated memory block, step 542. In this way, TSE restores the mapping to what Windows thinks it is. If it is registered and is terminating, step 520, TSE deallocates the associated allocated per-instance memory, step 522, unregisters the task, step 524, and, if the task was the one associated with receiving TSE task switch notifications, TSE transfers the association to another TSE-registered task, step 526.

TSE switches the base addresses by using the DOS Protected Mode Interface (DPMI) functionality. TSE uses two functions provided by DPMI, one to request the base address of a descriptor addressed by a selector provided by the application, and the other to change the base address of a descriptor addressed by a selector provided by the application.

The TSE task, which owns the original task handle that TSE used when calling NotifyRegister( ), may terminate. In that case, TSE calls NotifyUnregister( ) for that task handle and then calls NotifyRegister( ) again, passing the task handle of the first task in the list of tasks registered with TSE, which first task then becomes the TSE task. This is done because Windows will not call the callback if it is associated with a task that has terminated.

Note that, in Windows, a memory block can be owned either by an application or by a DLL. Data segments allocated by the loader as part of loading a DLL are owned by the DLL. The segments TSE allocates for the per-instance data are owned by the task that TSE is linked to at the time TSE does the allocation.

If all tasks registered with TSE terminate, TSE will release the allocated memory and selectors and then terminate.

Unregistering

Although task un-registration is not strictly required, because TSE monitors task terminations and can do so automatically, it is provided by means of TseTaskUnregister( ) as a safety precaution. A DLL that is to be used with TSE should be coded to unregister itself, in its WEP( ) (Windows Exit Procedure) procedure, for example.

TSE API Details

The following five routines provide library instantiation services.

1. BOOL TseDllRegister(hLibInst, initCallback) registers the DLL identified by hLibInst with TSE. The second argument is the address of the callback function called by TSE when DLL is instantiated/terminated. TseDllRegister( ) is usually called from LibMain( ) where the instance handle is readily available. Thus, the instance handle is converted into a module handle to simplify later module table lookups.

2. initCallback(wReason) is a placeholder for the user function that is called by TSE. The parameter wReason specifies the event that triggered the call. When called because the DLL is instantiated, the callback should instantiate all the segments containing per-instance data and then initialize them.

3. TseDllUnregister(hLibInst) removes the DLL identified by hLibInst from the registered DLLs list.

4. TseDllInstantiate(hLibInst) instantiates the DLL specified by hLibInst for the current task. This routine checks that the DLL identified by hLibInst is registered and ignores unregistered ones. It checks that the current task is registered with TSE. If the DLL has been already instantiated for the task, this routine returns. Otherwise, it calls the DLL's notification callback and stores per-instance data information in the task list for this task.

5. TseDllInstantiateAll( ) calls TseDllInstantiate( ) for each DLL used by the current task.

The following three routines provide segment instantiation services.

1. TseTaskRegister( ) adds the current task to the TSE task list. On the first call, it links the current task to TSE (which is a DLL). (This task may be referred to as the TSE task. This routine should be called before either TseDllInstantiate( ) or TseDllInstantiateAll( ).

2. TseTaskUnregister( ) removes the current task from the TSE list. All the instantiated segments of the task are restored to their original state.

3. TseSegmentInstantiate(hInstance, hSegment) checks that the current task has been registered. It allocates a new segment, makes a copy of hSegment into it, and swaps the addresses of those two segments. The argument hinstance identifies the segment's owner: it is a DLL handle.

Data Structures

TSE's basic data structures are a TSE registered library list (a linked list of LIBENTRY structures) and a TSE registered task list (a linked list of TSENTRY structures).

The registered library list keeps the module handle of each DLL in the LIBENTRY structure as the primary search key, although the module name is also maintained for error monitoring purposes. The TSE_NOTIFYCB initialization function pointer is maintained here; it is DLL specific and will not vary as a function of the application. The original DLL FGL_INSTDATA selectors (the selectors for the DLL's original data segment) are also kept for error detection and monitoring purposes. The structures of the registered library list are illustrated in the following table.

```
// Start of Library Selector List structs
struct tagLIBSEL {
    struct tagLIBSEL *pNext;
    UINT selector;
};
typedef struct tagLIBSEL LIBSEL, *PLIBSEL;
struct tagLIBENTRY {
    char modName[9];
    HMODULE hLibrary;
```

```
    CINITPROC pInitProc;  //Called when the Exe has been initialized
              //if "moduleInitialized is FALSE
    BOOL moduleInitialized;//TRUE if DLL initialized
    UINT usageCount;  //TSE usageCount (Maybe not same as system use
count
              //Inc/Dec when Task Starts/Terminates
    PLIBSEL pSelList;
    struct tagLIBENTRY *pNextLib;
    };
typedef struct tagLIBENTRY LIBENTRY, *PLIBENTRY;
```

The TSE registered task list is a linked list of TSENTRY structures containing the HTASK (task handle) as the primary search key. It contains a pointer to a linked list of TLIBENTRY structures which identify the DLLs being used by the task. This list is maintained for error detection and recovery. It also contains a linked list of TLIBSEL structures where the original and the allocated per-instance selectors are maintained for switching on task entry and exit. A flag "selSwitchMode" in the TLIBSEL structure determines if the selector being used currently is the original selector or the selector allocated for this instance. This is used for error detection and for switching selectors back to their original state during task termination. The module name and module handle are redundantly kept in the TLIBENTRY and the TLIBSEL for monitoring and error detection. These data structures are illustrated in the following table.

```
struct tagTLIBENTRY {
    char modName[9];  //Name for this DLL
    HMODULE hLibrary;  //For this DLL
    CINITPROC pInitProc;//Called when the Exe has been initialized
              //if "moduleInitialized is FALSE
    BOOL memoryAllocated;//TRUE if DLL memory has been allocated
    BOOL moduleInitialized;//TRUE if DLL is initialized
    PLIBSEL pSelList;//Linked list of selectors maintained by TSE
    struct tagTLIBENTRY *pNextLib;
    };
typedef struct tagTLIBENTRY TLIBENTRY, *PTLIBENTRY;
struct tagTLIBSEL {
    char modName[9];//Name of DLL using these selectors
    HMODULE hLibrary;//HMODULE for DLL using these selectors
    BOOL selSwitchMode;  //SWITCHED = TRUE
    BOOL memoryAllocated;  //True if Memory Allocated
    UINT origSelector;  //Original Selector
    UINT taskSelector;  //Instance Selector
    struct tagTLIBSEL *pNextSel;
    };
typedef struct tagTLIBSEL TLIBSEL, *PTLIBSEL;
struct tagTSENTRY {
    HTASK hTask;  //Task HANDLE for task using this structure
    HINSTANCE hInstance;
    UINT instanceNumber;
    char taskName[9];
    char newTaskName[9];
    char taskFilename[13];
    char newTaskFilename[13];
    BOOL dllsInitialized;//Task has all it's DLLs initialized
    PTLIBENTRY pTaskLibList;  //Linked list of DLLS using TSE for
this task
    PTLIBSEL pTaskSelList;  //List of selectors used by TSE for this task
    struct tagTSENTRY *nextTask;
    };
typedef struct tagTSENTRY TSENTRY, * PTSENTRY;
```

Example Application Initialization Sequence

The discussion below illustrates initialization sequence for a MYAPP application that uses a MYLIB.DLL (assume for this illustration to be a C library).

[MYAPP]
 The user starts MYAPP.EXE. Kernel passes control to astart( ), which calls InitTask( ), which is a call to kernel to load DLLs.

[KERNEL]
 For each DLL needed by the application that is not already in memory, kernel loads it and calls its entry point libentry( ).

[MYLIB]
 The routine libentry( ) calls _cinit( ) for C runtime initialization, which in turn calls LibMain( ). LibMain( ) registers the DLL with TSE by calling TseDllRegister (hLib, InitInstance).

[TSE]
 TSE adds (hLib, InitInstance) to its registered library list and returns to MYLIB.

[MYLIB]
 LibMain( ) returns TRUE.

[KERNEL]
 Kernel proceeds as above with other DLLs. After all DLLs have been loaded, kernel returns to the application.

[MYAPP]
 The application calls _cinit( ) for C runtime initialization, which then calls WinMain( ), where the user code begins. WinMain( ) calls TseTaskRegister( ).

[TSE]
 TseTaskRegister( ) adds the current task to the registered task list. (No instantiated segments have been created yet.)

[MYAPP]
 WinMain( ) calls TseDllInstantiateAll( ).

[TSE]
 TseDllInstantiateAll( ) scans the list of DLLs needed by MYAPP. For each registered DLL, it calls the DLL's callback with a reason code indicating that segments are to be instantiated.

[MYLIB]
 The callback routine calls TseSegmentInstantiate.

[TSE]
 TseSegmentInstantiate( ) makes a copy of the segment, and adds original and copied selectors to the list of segments to be swapped on activation of the current task.

[MYLIB]
 After TseSegmentInstantiate( ) returns, the callback routine returns to TSE.

[TSE]
 Continues for other DLLs.

[MYAPP]
 Executes application system initialization code to register classes and initialize variables. Finally, it calls the main application module.

Consolidating Data and Initialization

As has been mentioned, per-instance data is linked into contiguous segments for processing by TSE. A data consolidation mechanism may also be needed in the case of programming languages or environments with an object or class oriented design, such as a 4GL. This may arise in two cases. First, for initialization, each compiled module may contain the code that has to be executed before a main program gets control. Classes that the application will use may have to be registered in order to calculate member variable offsets and object sizes. Also, if any global and/or shared member variables are defined in a module and explicitly initialized, the initialization code has to be executed. A 4GL compiler typically generates one initialization function per module and a variable containing the address of it. By making the linker build an array of those addresses, start-up code is able to call them easily.

Consolidation across modules is also useful if a DLL is to be used by a pseudo-code interpreter, for which the DLL must supply function names and their addresses. A FGL compiler can generate an array of these for each module, and the linker can be made to consolidate these arrays from all the modules that the DLL contains.

The Microsoft linker provides a consolidation mechanism in the form of logical segments (not to be confused with 80x86 memory segments, which are named segment groups). Logical segments control how the linker combines the code and data when it builds an executable from separate modules. Each object code entity (function code and global variable) belongs to some particular logical segment. A logical segment has a number of attributes associated with it that control where it will be located in the executable, including segment group and segment class.

Segment group is used by the linker to combine logical segments into physical segments: all the logical segments belonging to the same group are put into one physical segment. To specify a logical segment's group, a GROUP directive in an assembler module is used.

Segment class together with segment name controls how the logical segments from the different object modules are combined. The linker combines the data from all the segments with the same name and class into one contiguous block of memory. Within the class, the data belonging to the same segment is put into one contiguous block. The relative order of the segments within a class is determined by the order in which the linker sees them.

With a Microsoft C compiler, variables may be allocated to specific segments with a #pragma directive. The directive

```
#pragma data_seg("MYSEG", "MYCLASS")
``` instructs the compiler to put all the variables that follow the directive into segment MYSEG, which belongs to the class MYCLASS. For multiple #pragma data_seg directives, the compiler generates logical segments in the reverse order of their declarations in the source code.

Thus, data from separate modules can be consolidated into a contiguous array and its starting and ending address can be obtained as follows. First, each module must define the same logical segment sequence, for example:

```
#pragma data_seg("FGL_FOO_END", "FGL_FOO")
#pragma data_seg("FGL_FOO_USER", "FGL_FOO")
#pragma data_seg("FGL_FOO_BEGIN", "FGL_FOO")
#pragma data_seg( )
```

Each object module will then contain the segments FGL_FOO_BEGIN, FGL_FOO_USER, and FGL_FOO_END, in that order. Data to be consolidated is then put into the FGL_FOO_USER segment, the middle segment in the set of three.

The runtime start-up module declares the segment sequence as above and provides a dummy element at the beginning:

```
static footype _based (_segname("FGL_FOO_BEGIN"))
foo_begin = NULL;
``` and a label at the end:

```
static footype _based (_segname("FGL_FOO_END"))
foo_end = NULL.
```

As a result, the executable will contain an array of data, of any kind, sandwiched between foo_begin and foo_end. Thus, if the data is an array of initialization functions, initialization may be accomplished by calling only one routine and passing it the address of the initialization functions vector and the address of the first word after the end of it.

Data and function consolidation is useful, as has been mentioned, in the context of 4GL programs interpreted by a pseudo-code (p-code) interpreter. DLLs supporting TSE per-instance data can be made accessible to p-code interpreted applications. As described, each DLL will be built to export a "userfunc" array, that is, an array of function names and their entry points, for use by the interpreter to resolve the references to DLL functions, as well as by the debugger.

In addition to the function names, the userfunc array may also contain the name/address pairs of the global and shared member variables defined in a DLL, that need to be accessed from the p-code interpreter or from a debugger.

Generating userfunc. A 4GL compiler can generate a userfunc array for each FGL module. It contains the entries for all the functions and methods defined in the module as follows:

```
// Provide segment ordering
#pragma data_seg("FGL_UF_END", "FGL_UF")
#pragma data_seg("FGL_UF_USER", "FGL_UF")
#pragma data_seg("FGL_UF_BEGIN", "FGL_UF")
// Reset to default data segment
#pragma data_seg( )
// Put userfunc into FGL_UF_USER segment
static struct userfunc _based (_segname("FGL_UF_USER"))
    _FGLuserfunc[] = {
        {"function1", (USERFUNC)function1,<#args>}
        {"function2", (USERFUNC)function2,<#args>}
        ..................
    };
```

The runtime start-up can then provide the entry point for the consolidated userfunc array as follows:

```
// Provide dummy exportable entry
struct userfunc _based (_segname("FGL_UF_BEGIN")) _export
    _FGLuserfunc[] = { {"",NULL} // so it will not match any name
    };
// A sentinel
static struct userfunc _based (_segname("FGL_UF_END"))
    _FGLuserfunc[] = {
        {NULL,NULL}
    };
```

Generating Module Initialization Code

A 4FGL compiler can generate the module initialization function in an FGL_INIT segment as follows:

```
// Define segment ordering, then reset to default segment
#pragma data-seg("FGL_INIT_END","FGL_INIT")
#pragma data_seg("FGL_INIT_USER","FGL_INIT")
#pragma data_seg("FGL_INIT_BEGIN","FGL_INIT")
#pragma data_seg( )
// Define module initialization function address
static void * _based (_segname("FGL_INIT_USER"))
```

-continued

```
_FGLinitptr = (void *)_FGLinitc;
```

The runtime start-up can then provide an entry point for the consolidated module initialization functions array as follows:

```
// Provide beginning
void * _based (_segname("FGL_INIT_BEGIN"))
    _FGLinitfunc0 = NULL;
// Provide sentinel
void * _based (_segname("FGL_INIT_END"))
    _FGLinitfuncN = NULL;
```

As a result, &_FGLinitfunc0 and &_FGLinitfuncN are starting and ending addresses, and if the segment FGL_INIT_USER is loaded with initialization routine addresses, the initialization can be performed by calling one routine, for example,

```
fglInitAll(&_FGLinitfunc0,&_FGLinitfuncN),
``` that successively calls each function whose address is loaded in the segment.

Logical Segments and Groups

In order to save space in the default data segment of the executable and in the instantiated data segment in a DLL, all static data can be put into a separate, read-only segment group, named, for example, FGL_RODATA. This group may contain the illustrative segments listed in the assembly language source code module set forth later in this description For an application, the segments in FGL_RODATA and the group itself are defined in an assembler object code module. In addition to the segments and group definitions, the module contains a dummy variable referenced in the application initialization module to ensure that this assembler object module will be loaded with the application to give effect to the segment and group definitions in the linker.

For a DLL there may be two 4GL-specific groups, FGL_RODATA as described and FGL_INSTDATA. FGL_INSTDATA may contain the a logical segment for per-instance variable information and data.

The definitions of the segments and groups for a DLL are in an assembly language module that also contains the function FGLInstanceSeg( ), which returns the selector assigned to the FGL_INSTDATA group. Source code for such an assembly module is shown in the following table.

```
; This module contains definitions of the logical segments and
; segment group (i.e., physical segments) used by system and
; user FGL DLLs.
; It also contains FGLInstanceSeg( ) function that returns the
; segment of the FGL_INSTDATA.
; The following table summarizes the segments defined, their
; order and usage.
```

| Segment | Class | Size | Rd/Wri | Usage |
|---|---|---|---|---|
| FGL_INIT_BEGIN | FGL_INIT | 4 | RO | Provides the address of module initiaization functions array |
| FGL_INIT_USER | FGL_INIT | varies | RO | Addresses of module initialization functions |
| FGL_INIT_END | FGL_INIT | 4 | RO | Sentinel for the array |
| FGL_UF_BEGIN | FGL_INIT | 12 | RO | Provides the address of the userfunc array |
| FGL_UF_USER | FGL_INIT | varies | RO | Userfunc array |
| FGL_UF_END | FGL_INIT | 12 | RO | Userfunc array sentinel |
| FGL_VT | FGL_VT | varies | RO | Class virtual address tables |
| FGL_CI | FGL_CI | varies | RW | Other class information |
| FGL_DATA | FGL_DATA | varies | RW | User data |

```
; Two segment groups are defined:
;   FGL_RODATA     contains read-only data (FGL_INIT_xxx,
;                  FGL_UF_xxx, and FGL_VT segments)
;   FGL_INSTDATA   contains instantiated data (FGL_DATA and FGL_CI)
; Init_related segments.
FGL_INIT_BEGIN    SEGMENT   WORD PUBLIC 'FGL_INIT'
FGL_INIT_BEGIN    ENDS
FGL_INIT_USER     SEGMENT   WORD PUBLIC 'FGL_INIT'
FGL_INIT_USER     ENDS
FGL_INIT_END      SEGMENT   WORD PUBLIC 'FGL_INIT'
FGL_INIT_END      ENDS
FGL_RODATA        GROUP     FGL_INIT_BEGIN,FGL_INIT_USER,FGL_INIT_END
; Userfunc-related segments
FGL_UF_BEGIN      SEGMENT   WORD PUBLIC 'FGL_UF'
FGL_UF_BEGIN      ENDS
FGL_UF_USER       SEGMENT   WORD PUBLIC 'FGL_UF'
FGL_UF_USER       ENDS
```

| | | -continued |
|---|---|---|
| FGL_UF_END | SEGMENT | WORD PUBLIC 'FGL_UF' |
| FGL_UF_END | ENDS | |
| FGL_RODATA | GROUP | FGL_UF_BEGIN,FGL_UF_USER,FGL_UF_END |
| ; VTAB | | |
| FGL_VT | SEGMENT | WORD PUBLIC 'FGL_VT' |
| FGL_VT | ENDS | |
| FGL_RODATA | GROUP | FGL_VT |
| ; CLASSINFO | | |
| FGL_CI | SEGMENT | WORD PUBLIC 'FGL_CI' |
| FGL_CI | ENDS | |
| FGL_INSTDATA | GROUP | FGL_CI |
| ; User data | | |
| FGL_DATA | SEGMENT | WORD PUBLIC 'FGL_DATA' |
| dataLabel | label | byte |
| FGL_DATA | ENDS | |
| FGL_INSTDATA | GROUP | FGL_DATA |
| ; | | |
| ; FUNCTION: | FGLInstanceSeg | |
| ; PURPOSE: | Returns the segment of the FGL_INSTDATA group | |
| ; | | |
| | .MODEL | LARGE,C |
| | .CODE | |
| _FGLInstanceSeg | PROC | |
| | MOV AX, SEG datalabel | |
| | RETF | |
| _FGLInstanceSeg | ENDP | |
| | PUBLIC | _FGLInstanceSeg |
| | END | |

Multiple Instances of .EXE Programs

As a corollary to the ability to run multiple instantiations of one DLL simultaneously, it is desirable to be able to run multiple instantiations of one program simultaneously and, more particularly, multiple instantiations of one .EXE program. Windows limits one's ability to run multiple instantiations of one .EXE program by rejecting requests to run multiple instances of an .EXE program that has multiple writable segments, which limits writable data in .EXE programs that are intended for multiple instantiations to 64 Kbytes (16-bit addressing space). When multiple instances of an .EXE program are run, the code can be shared by all instances and the per-instance writable data, being limited to 64 Kbytes, for each instance has its own, task-specific DS register value by Windows.

To overcome the Windows limitation, the writable segments in an .EXE program could be disguised, so Windows would load the multiple instances and share one copy of the code; and then the techniques described above, of dynamically creating per-instance writable segments and swapping base addresses in the LDT, could be applied to achieve larger amount of writable data in an .EXE program. A simpler solution is available, however. TSE achieves the desired result by transforming the name of an .EXE program that has invoked TSE (presumably because it is intended to be run in multiple instances) in the Windows module table. The test by which Windows recognizes that a second instance of a program is being run turns out to be case sensitive, while the stored name is always upper case. By changing, for example, the case of the first letter of the .EXE program's name in the module table, multiple instances may be run. This is done at the cost of some computer memory, however, since each instance will have not only its own copy of the writable data, as desired, but also its own copy of the program's code.

The present invention has been described in terms of specific embodiments. The invention, however, is not limited to these specific embodiments. Rather, the scope of the invention is defined by the following claims, and other embodiments are within the scope of the claims. For example, the invention can be used by other languages such as PASCAL to support multi-instance data. Also, the invention can be used to implement thread support on top of an operating system that otherwise does not provide it. Also, what has been described is an embodiment in which per-instance data is loaded into one or more per-instance segments and shared data is loaded into other segments (in particular DGROUP). In a small memory model embodiment, or to have a per-instance DGROUP, the descriptor base address by the DGROUP is also switched by TSE.

What is claimed is:

1. A method for providing per-instance data memory in a dynamic link library (DLL) having multiple segments including a segment containing global variables, the DLL being loaded in a random access memory (RAM) address space both as part of a first task and as part of a second task loaded in the RAM address space simultaneously, in a computer having memory management hardware including a local descriptor table (LDT) to map selectors to RAM base addresses, the computer running an operating system that uses a single LDT that is shared among the operating environment and all applications and that loads the DLL so that the segment containing global variables is initially shared by each task accessing the DLL, the method comprising:

providing a task switch enhancer DLL (the TSE);

providing in the TSE a DLL registration routine to register a DLL with the TSE when the DLL is loaded;

providing in the particular DLL a call to the DLL registration routine;

providing in the TSE a task registration routine to register a task with the TSE when the task is started;

providing in the first task and in the second task a call to the task registration routine;

providing in the TSE a routine requesting the operating system to provide the TSE a switching notification whenever execution of any task is about to begin or end and whenever any task is about to cease to exist;

providing in the TSE a segment allocation routine for allocating a memory segment for storing per-instance data of a DLL for a task, which allocated segment is a substitute for an original per-instance data segment for that task, the original segment being referenced through a selector in the particular DLL referencing an LDT entry, the segment allocation routine maintaining a substitute base address being a base address for the allocated segment in the LDT entry and maintaining an original base address being the original base address of the original segment in the LDT entry;

calling the TSE segment allocation routine for a per-instance data segment of the particular DLL for the first task during initialization of the first task and calling the TSE segment allocation routine for a per-instance data segment of the particular DLL for the second task during initialization of the second task;

providing in the TSE a base address setup routine to store in the LDT entry the substitute base address of a per-instance segment of a task before that task begins execution; and invoking the base address setup routine for the substitute base address for the first task in response to a switching notification received by the TSE that the first task is about to begin execution.

2. The method of claim 1, further comprising:

in response to a switching notification received by the TSE, storing the original base address in the LDT entry for the per-instance segment of the particular DLL when no task is using that particular DLL is about to begin execution.

3. The method of claim 1, further comprising:

in response to a switching notification received by the TSE, linking the TSE to another TSE registered task if the TSE is linked to a task that is about to cease to exist.

4. The method of claim 1, where:

the operating system is selected from the group consisting of Microsoft® Windows 3.1 and Microsoft® Windows 3.11; and the computer is based on a microprocessor compatible with the Intel® 80386 microprocessor.

5. In the context of a multitasking operating system providing for the loading of a dynamic link library (DLL) having a segment containing global variables in a random access memory (RAM) address space and the linking of the DLL to multiple tasks loaded in the RAM address space simultaneously, the operating system using a single local descriptor table (LDT) to map selectors to RAM base addresses the LDT being shared among the operating environment and all applications, the operating system operating to load the DLL so that the segment containing global variables is initially shared by each task accessing the DLL, a kit for providing per-instance data memory for a particular DLL loaded both as part of a first task and as part of a second task, the kit comprising: a task switch enhancer DLL (the TSE) including a DLL registration routine to register a DLL with the TSE when the DLL is loaded;

a task registration routine to register a task with the TSE when the task is started;

a routine requesting the operating system to provide the TSE a switching notification whenever execution of any task is about to begin or end and whenever any task is about to cease to exist;

a segment allocation routine for allocating a memory segment for storing per-instance data of a DLL for a task, which allocated segment is a substitute for an original per-instance data segment for that task, the original segment being referenced through a selector in the particular DLL referencing an LDT entry, the segment allocation routine maintaining a substitute base address being a base address for the allocated segment in the LDT entry and maintaining an original base address being the original base address of the original segment in the LDT entry; and a base address setup routine to store in the LDT entry the substitute base address of a per-instance segment of a task before that task begins execution.

6. The method of claim 1, wherein the step of providing in the TSE a segment allocation routine further comprises:

allocating a block of memory of the same size as the original data segment referenced by the selector;

copying the contents of the original data segment into the allocated block of memory; and maintaining the original selector and a selector of the allocated block of memory in a list of selector pairs used by the task.

7. The kit of claim 5, wherein the TSE allocates a block of memory of the same size as the original data segment referenced by the selector, the contents of the original data segment being copied into the allocated block of memory, and the original selector and a selector of the allocated block of memory in a list of selector pairs used by the task are maintained by the TSE.

* * * * *